A. J. GIBSON.
Whiffletree.
No. 11,425
Patented Aug. 1. 1854.
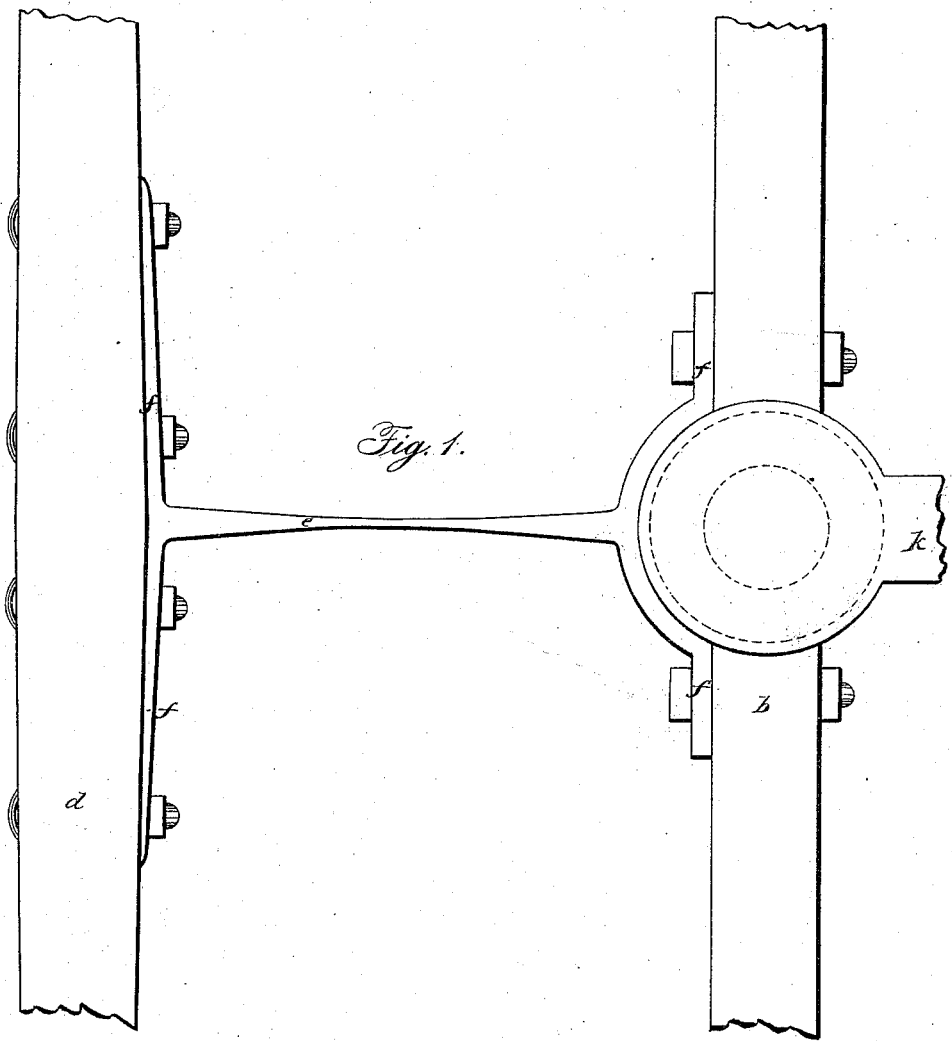
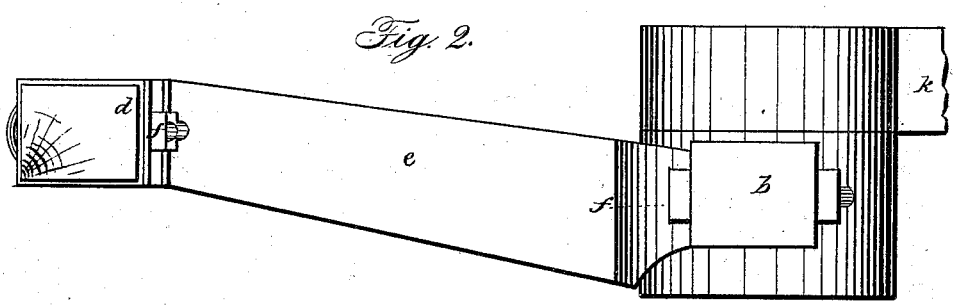

UNITED STATES PATENT OFFICE.

A. J. GIBSON, OF CLINTON, MASSACHUSETTS.

MODE OF ATTACHING WHIFFLETREES TO VEHICLES.

Specification of Letters Patent No. 11,425, dated August 1, 1854.

*To all whom it may concern:*

Be it known that I, ABRAM J. GIBSON, of Clinton, in the county of Worcester and State of Massachusetts, have invented a new and useful Improvement in the Mode of Attaching Whiffletrees to vehicles; and I do hereby declare that the following is a full, clear, and exact description of the same, reference being had to the annexed drawing, forming part of this specification, in which—

Figure 1 is a plan of attachment of the whiffle-tree to the axle. Fig. 2 is a side view of the same.

The same letters indicate like parts in all the figures.

My invention consists in the attachment of the whiffle-tree to vehicles by means of a steel spring, one end being made fast to the whiffle-tree, and the other in the center and front of the forward axle. The advantage gained by this mode of attachment is, that it allows of a sufficient motion to the whiffle-tree, in the draft, and makes a safe, permanent, and durable attachment. In the usual mode of attachment, the motion of the draft is brought upon the bolts or straps which connect the whiffle-tree with the vehicle, causing them to wear and get loose; whereas, in my mode of attachment, the motion of the whiffle-tree, in draft, is communicated directly to the center of the spring.

Having pointed out the nature of my invention, and some of the advantages to be derived from the same, I will now proceed to describe its several parts, reference being had to the annexed drawing, in which, $b$ represents the forward axle, $k$ the perch, $d$ the whiffle-tree, and $e$ the spring of steel or other suitable elastic material, which connects the whiffle tree and forward axle $b$, by means of bolts and clasps passed through and around the side arms $f$ of the said spring $e$.

The advantage to be derived from this attachment, besides those previously mentioned, is, that the cross bar which is usually used to connect the thills together, and to which the whiffle-tree is attached, is dispensed with, and the whiffle-tree attached directly to the forward axle $b$ by means of the spring $e$, whereby the horse is brought nearer the point of draft, and consequently can move the load with greater ease.

Having described the several parts of my invention, what I claim as new and desire to secure by Letters Patent is—

The manner of attaching the whiffle tree to vehicles by means of a steel spring, in the manner and form, substantially as set forth.

In testimony whereof, I have hereunto signed my name before two subscribing witnesses.

A. J. GIBSON.

Witnesses:
   GEO. PATTEN,
   SAML. GRUBB.